United States Patent [19]
Kuwayama et al.

[11] Patent Number: 5,617,184
[45] Date of Patent: Apr. 1, 1997

[54] APPARATUS FOR TURNING A NEGATIVE FILM CARRIER

[75] Inventors: Masahiko Kuwayama, Urawa; Yoshihiro Yamamoto, Tokyo, both of Japan

[73] Assignee: Samsung Aerospace Industries, Ltd., Changwon, Rep. of Korea

[21] Appl. No.: 311,405

[22] Filed: Sep. 23, 1994

[30]     Foreign Application Priority Data

Sep. 24, 1993   [JP]   Japan .................... 5-56528 U

[51] Int. Cl.$^6$ .................. G03B 27/62; G03B 27/48
[52] U.S. Cl. .................. 355/75; 355/48; 355/50
[58] Field of Search .................. 355/67, 71, 75, 355/70, 48, 49, 50

[56]           References Cited
             U.S. PATENT DOCUMENTS 4,111,548   9/1978  Pechev et al. .................. 355/30
4,227,804  10/1980  Pramstraller .................. 355/67
5,045,877   9/1991  Lucht et al. .................. 355/71

Primary Examiner—Arthur T. Grimley
Assistant Examiner—Herbert Kerner
Attorney, Agent, or Firm—Morgan & Finnegan, L.L.P.

[57]           ABSTRACT

A printer film carrier turning apparatus for obtaining a photograph by irradiating light onto a film comprises a film carrier for supporting the film, a carrier supporting table for supporting the film carrier parallel with the film to make the film carrier turn through a 90° range, and a light diffusion box for diffusing illuminance light to uniformly illuminate a film range which is to be printed. The film turning apparatus is constructed such that the film carrier turns in unison with the light diffusion box. Therefore, transferring rollers of the film carrier cannot interfere with the light diffusion box, which allows the light diffusion box to be placed very close to the film carrier and thereby increases the efficiency of the light source. Also, the film carrier can be turned in unison with the light diffusion box, thereby improving the operating mechanism.

2 Claims, 2 Drawing Sheets

APPARATUS FOR TURNING A NEGATIVE FILM CARRIER

BACKGROUND OF THE INVENTION

The present invention relates to an apparatus for turning a negative film carrier applied to a photograph printing apparatus, and more particularly, to an apparatus for turning a negative film carrier having an improved construction such that interference with peripheral elements caused by the film carrier's turning is prevented.

FIG. 1 is a schematic diagram showing the overall structure and component layout of a conventional printer for use in photograph printing. Here, printing paper is wound on a roll 2 in the upper portion of a printer body 1, and a container 12 for enclosing roll 2 is provided. A tray 18 for receiving the printing paper after being cut into pieces by a cutter 17 installed adjacent thereto is provided in the upper portion of the other side of printer body 1. Disposed along the path of the printing paper between container 12 and tray 18 is an exposing portion 13 and a processing portion 16. The exposing portion 13 is arranged vertically and located adjacent to an optical system (described below), to thereby expose the downwardly proceeding printing paper, while the processing portion 16 is provided with a multitude of transfer rollers and processing chambers, for processing and fixing the exposed printing paper. In addition, a cavity 14 where the exposed printing paper stays temporarily is provided in the lower portion of exposing portion 13.

The optical system includes, aligned along a single optical axis OA, a light source 4 for generating light that exposes the printing paper, a color filter 5 for passing a specific wavelength of light emanating from light source 4, a light diffusion box 6 for uniformly diffusing filtered light from color filter 5, and a table 7 positioned above light diffusion box 6, for supporting a negative film carrier 8. Further, again along optical axis OA, an image forming lens 9 is provided above table 7, and a shutter 10 for controlling the passage of light from image forming lens 9 is provided above the lens. In addition, a mirror 11 for reflecting the light passed through shutter 10 along optical axis OA' toward exposing portion 13 is situated at the proper angle above the shutter.

In an actual exposure, the light generated from light source 4 passes through the negative film (hereinafter also referred to as "film") on film carrier 8 and forms image light. Then, the image light passes through image forming lens 9 and reaches printing paper 3 via mirror 11, thus forming an image on the printing paper. In the formation of the image on the printing paper 3 as above, the exposure time depends on the opening time (speed) of shutter 10. Also, it is possible to achieve proper color or black-and-white photography through one exposing operation.

In FIG. 2, a portion of light diffusion box 6 and film carrier 8 are shown in detail. Film carrier 8 consists of a print mask 34 with a rectangular opening (window) of a predetermined size formed therein (e.g., 36×24 mm) and transferring rollers 32 and 33 near opposite sides of the print mask and separated by an interval A in the film transferring direction shown by arrow FT. Each transferring roller is composed of a pair of contiguous roller members. The film is fed between the roller members and transferred in one direction (as shown by the arrow FT in FIG. 2) by rotation of the roller members. After one frame of the transferred film is positioned exactly in the window of print mask 34, a photograph is obtained by exposing the printing paper as hereinbefore described. Here, light diffusion box 6 is used for uniformly illuminating the entire area of the window of print mask 34. Light diffusion box 6 comprises a housing having a rectangular cross-section, a sawtooth glass and a diffusion board which are attached at opposite ends of the housing. The upper edge portion of the light diffusion box is positioned between transferring rollers 32 and 33 of film carrier 8 and is adjacent to print mask 34. (Here, though depicted separately from the carrier supporting table 7 in FIG. 1 which is merely representative of an optical system, light diffusion box 6 is actually fixed to the table 7.)

The print paper used in the photograph printing apparatus is in the form of a long roll as described above. When a picture from the film is printed on the print paper, two conditions must be accommodated according to the desire print size or orientation. That is, the window of print mask 34 needs to be oriented horizontally for portrait prints and vertically for landscape prints. As such, film carrier 8 can be turned 90° while supporting the film.

The length of the film to be used in the printing varies according to the number of pictures taken. If there is only one picture on the film, that is, the film length equals the length of one picture portion (or frame), it is impossible to feed the film into the film carrier 8 (i.e., into either transferring roller 32 or 33) so that the one picture on the film is properly aligned with the window of print mask 34. Therefore, the film must be at least two pictures long.

FIG. 3. shows an example of film 25 having a length of two pictures 40. Here, a length B (about 38 mm) corresponds to each picture segment, that is, the length of one picture (36 mm) plus half of the approximately 4 mm interval between the pictures.

Therefore, to transfer the minimum length of film (corresponding to two picture segments) into film carrier 8, the relation between the interval A of FIG. 2 and length B of FIG. 3 must satisfy the relation A<2B. That is, the distance between transferring rollers 32 and 33 is required to be less than 76 mm.

As described above, in the conventional technique, it is necessary to meet the condition A<2B, and to turn film carrier 8 by 90° to accommodate both portrait and landscape printing.

However, since light diffusion box 6 is fixed on carrier supporting table 7 and part of the light diffusion box 6 (i.e., the upper edge portion) extends between the transferring rollers 32 and 33 of film carrier 8, when the film carrier turns, transferring rollers 32 and 33 are caught on the upper edge portions of the light diffusion box 6.

One of two methods can be considered to solve this problem. First, the light diffusion box 6 may be moved farther from transferring rollers 32 and 33, so that the upper edge portion of light diffusion box 6 is no longer positioned between transferring rollers 32 and 33. However, this increases the distance between the light diffusion box and print mask 34 of film carrier 8, resulting in reduced light usage efficiency. Second, transferring rollers 32 and 33 may be lifted when film carrier 8 turns, to thereby separate them from light diffusion box 6. Thereafter, the film carrier would be loaded at a predetermined position. However, this complicates the mechanism.

SUMMARY OF THE INVENTION

To solve the above conventional problem, it is an object of the present invention to provide a film carrier turntable having an improved structure, for turning a film carrier to enable portrait and landscape prints, without lowering light usage efficiency nor unnecessarily complicating the mechanism.

To achieve the above object, the apparatus for turning a negative film carrier according to the present invention comprises a film carrier for supporting a film; a carrier support table for supporting the film carrier so that the carrier can be turned through a 90° rotation within a plane parallel with the film; and a light diffusion box for diffusing illuminance light to uniformly illuminate a film range which is to be printed; wherein the film carrier and the light diffusion box are constructed to turn integrally.

In the carrier turning apparatus according to the present invention, when the film carrier turns 90° in order to change from the portrait state to the landscape state or vice versa, the light diffusion box is rotated together with the film carrier. As a result, there is no interference between the transferring rollers and the light diffusion box.

BRIEF DESCRIPTION OF THE DRAWINGS

The above objects and advantages of the present invention will become more apparent by describing in detail a preferred embodiment thereof with reference to the attached drawings, in which.

DETAILED DESCRIPTION OF THE INVENTION

Referring to the appended drawings, the preferred embodiment of a film carrier turning apparatus according to the present invention will be described below.

Figure 4:
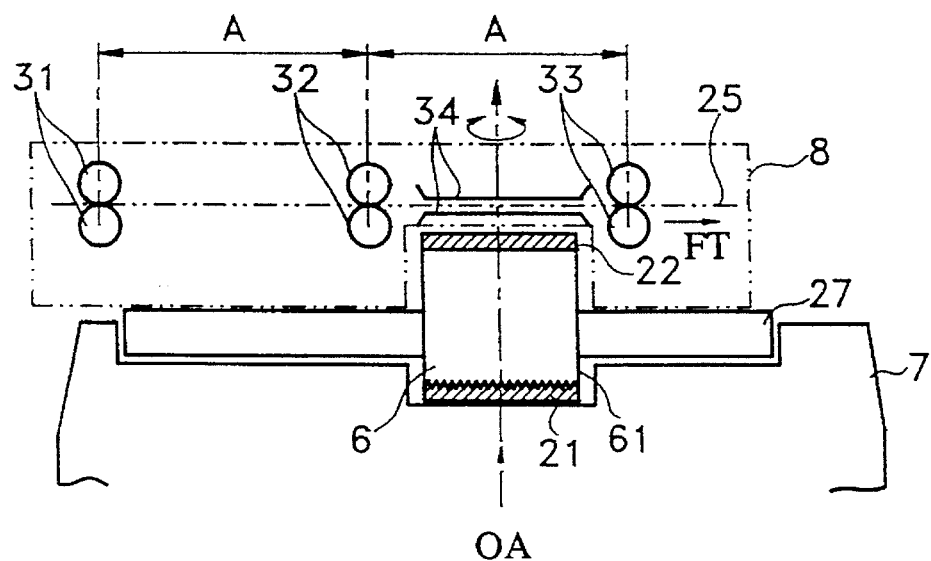
FIG. 4 is a side view schematically showing an apparatus for turning the film carrier according to the present invention.

FIG. 4 is a side view schematically showing the film carrier turning apparatus of the film carrier according to the present invention. Referring to FIG. 4, a turntable 27 is installed, for achieving a 90° rotation about optical axis OA within a plane parallel with the film to be transferred, in an upper portion of a carrier supporting table 7. A film carrier 8 is fixed on the upper portion of turntable 27. As a characteristic of the above construction, turntable 27 can turn relative to carrier supporting table 7, but turntable 27 and film carrier 8 turn together. A light diffusion box 6 is securely installed through an aperture in the center of turntable 27, thereby fixing each to the other. Also, the upper and lower portions of light diffusion box 6 insert into recesses in film carrier 8 and carrier supporting table 7, respectively. Thus, when turntable 27 turns, film carrier 8 and light diffusion box 6 turn about optical axis OA together with the turntable, relative to carrier supporting table 7.

Light diffusion box 6 has a housing 61 whose internal surface is mirror-processed. A diamond glass 21 having a multitude of raised pyramidal convex structures for light diffusion formed on its surface is attached to the lower portion of the housing and a diffusion board 22 is attached to the upper portion of the housing.

Figure 1:
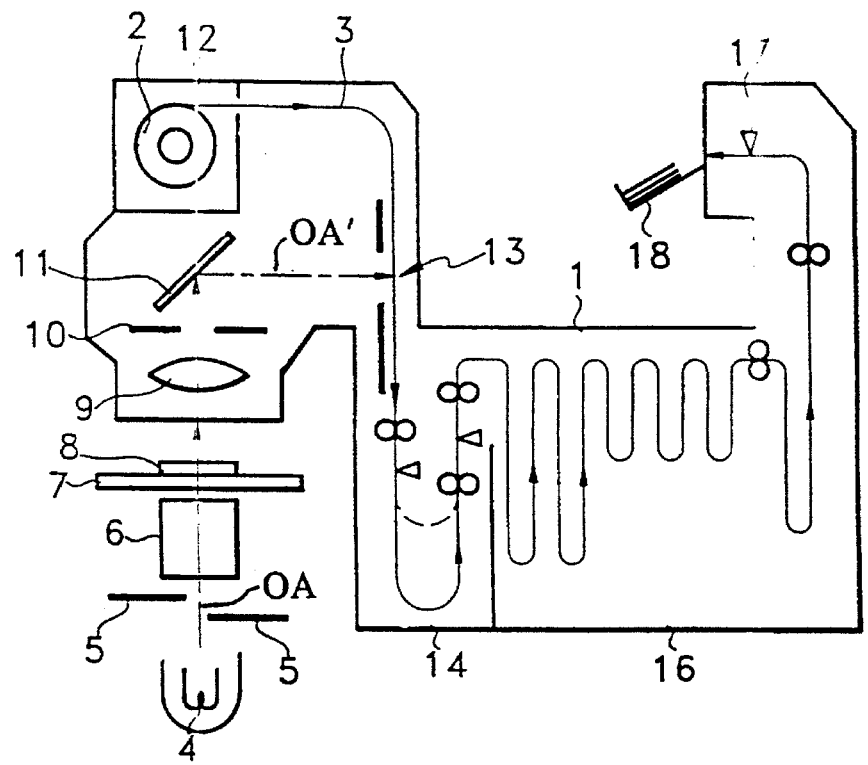
FIG. 1 is a side view schematically showing an example of a printer for printing a photograph in which a conventional film carrier is adopted.
Figure 2:
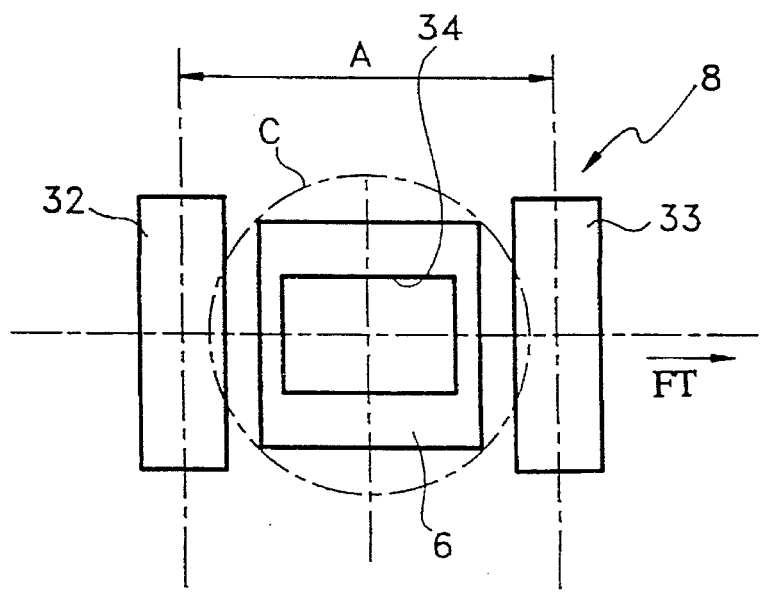
FIG. 2 is a plan view of the film carrier of the conventional printer.
Figure 3:
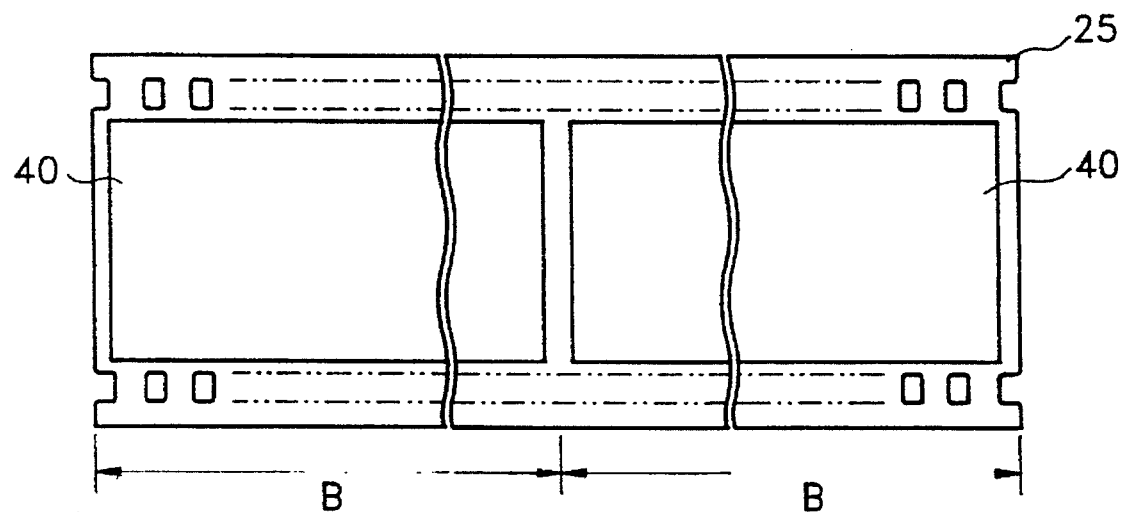
FIG. 3 is a plan view of a length of film.

Three pairs of transferring rollers 31, 32 and 33 are arranged in film carrier 8 along the path of film transfer (the direction of which is shown by arrow FT) at a predetermined interval A. Also, each transferring roller comprises two contiguous roller members. Interval A is set to less than 76 mm for supporting and transferring film 25 having a length of at least two picture portions, as described above. A pair of upper and lower print masks 34 are arranged between transferring rollers 32 and 33. Film 25, supported and transferred by the transferring rollers, is to be positioned between the pair of print masks 34 so as to maintain the flatness (picture portion) of the film 25 to be printed and determine the film range to be printed. Light diffusion box 6 is placed at the lower portion of print mask 34 and light from a light source 4 (refer to FIG. 1) is diffused so as to evenly illuminate film 25.

According to the above-described preferred embodiment, film carrier 8 and light diffusion box 6 are combined so as to turn integrally relative to carrier supporting table 7. Therefore, when film carrier 8 is turned 90° to change from portrait to landscape or vice versa, light diffusion box 6 turns in unison with the film carrier 8. Thus, even though a part of light diffusion box 6 (i.e., the upper portion) is positioned between transferring rollers 32 and 33 of film carrier 8, there is no interference between the transferring rollers and the light diffusion box. As a result, light diffusion box 6 can be adjacent to print mask 34 of film carrier 8, thereby increasing light usage efficiency. Also, film carrier 8 can turn without being separated from light diffusion box 6, thereby maintaining good operation speed and simple structure.

What is claimed is:

1. A film carrier turning apparatus comprising:

a film carrier for supporting a film;

a carrier supporting table for supporting and transferring said film carrier so that said carrier can be turned;

a turntable rotatably installed on the upper portion of said carrier supporting table;

a light diffusion box fixed through said turntable for diffusing illuminance light to uniformly illuminate a film range which is to be printed; and a plurality of pairs of film transferring rollers arranged in said carrier along the path of film transfer, wherein said film carrier and said light diffusion box are supported by said turntable and said light diffusion box is fixed on the upper portion of said light diffusion box.

2. The film carrier turning apparatus of claim 1 further comprising deflecting means for deflecting the path of an image projected from said illuminated film range.

* * * * *